United States Patent [19]

Scarpino, III et al.

[11] 4,365,240

[45] * Dec. 21, 1982

[54] ATTITUDE CHANGE ALARM

[76] Inventors: Joseph J. Scarpino, III, 748 Lakewood Blvd., Akron, Ohio 44314; David A. Scarpino, 682 W. Paige Ave., Barberton, Ohio 44213

[ * ] Notice: The portion of the term of this patent subsequent to Aug. 18, 1998, has been disclaimed.

[21] Appl. No.: 247,342

[22] Filed: Mar. 25, 1981

Related U.S. Application Data

[63] Continuation of Ser. No. 26,531, Apr. 3, 1979, Pat. No. 4,284,984.

[51] Int. Cl.$^3$ .................. B60R 25/10; G08B 13/00
[52] U.S. Cl. ........................ 340/571; 340/27 AT; 340/52 H; 340/65; 340/568
[58] Field of Search .................... 340/571, 568, 52 H, 340/61, 65, 669, 686, 27 AT

[56] References Cited

U.S. PATENT DOCUMENTS

| | | | |
|---|---|---|---|
| 2,823,367 | 2/1958 | Huron | 340/52 H |
| 3,701,093 | 10/1972 | Pick | 340/52 H |
| 3,710,371 | 1/1973 | Whalen et al. | 340/571 |
| 3,721,956 | 3/1973 | Hamann et al. | 340/571 |
| 4,284,984 | 8/1981 | Scarpino et al. | 340/571 |

*Primary Examiner*—Alvin H. Waring
*Attorney, Agent, or Firm*—Oldham, Oldham, Hudak & Weber Co.

[57] ABSTRACT

An attitude change alarm for securing articles from theft or other undesired movement. The alarm includes a case having a wall which defines a hollow interior. Resistive elements are maintained within the wall in spaced relationship with each other and in common communication with an electrically conductive surface on the outside of the wall. An electrically conductive member is fixedly maintained in the hollow interior in constant contacting engagement with a conductive fluid which makes selective engagement with certain of the resistive elements. When the alarm is moved, a current is transmitted from the conductive coating through the resistive elements, fluid, and member, and is passed to a transformer which gates an SCR into conduction, activating the alarm. Various geometrical configurations of the attitude change alarm are presented, each having specific attributes associated therewith.

16 Claims, 6 Drawing Figures

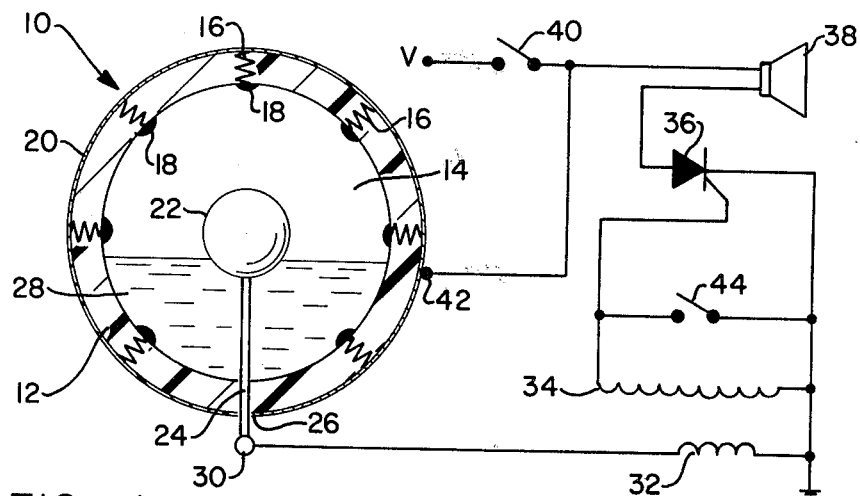
FIG.—1
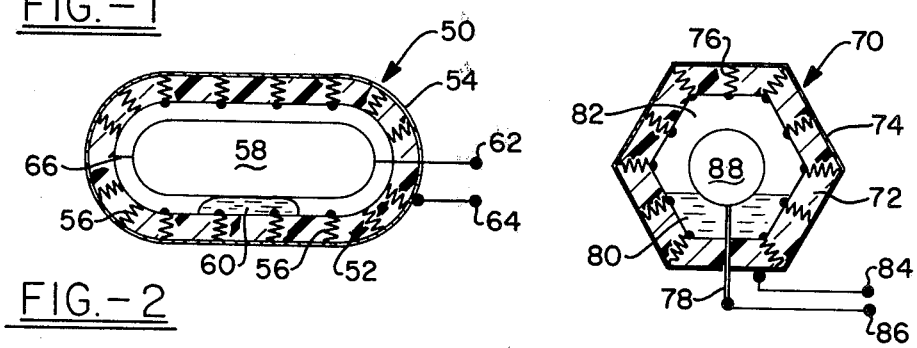
FIG.—2     FIG.—3
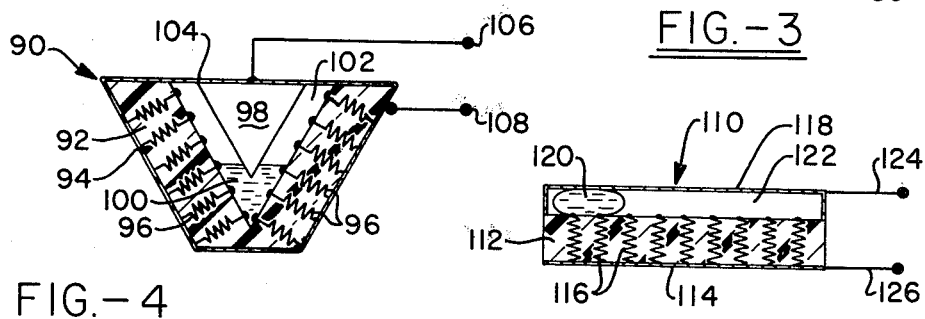
FIG.—4     FIG.—5
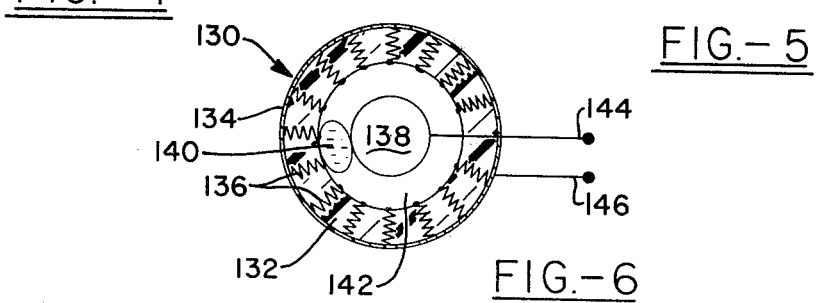
FIG.—6

ATTITUDE CHANGE ALARM

This is a continuation of application Ser. No. 26,531, filed Apr. 3, 1979, now U.S. Pat. No. 4,284,984.

BACKGROUND OF THE INVENTION

The invention herein resides in the art of alarm systems and particularly in that of electronic alarm systems for sensing changes in attitude of the object to be secured. The invention uses an electrically conductive fluid to make and break contact with resistive elements and, in that regard, attention is directed to U.S. Pat. No. 2,740,028. However, the differences between the instant invention and that of the prior art teaching are such that no elaboration on the prior art device need be presented herein.

Presently, theft of small articles which are left unattended has become quite common. Devices have been proposed for securing such articles, but, to date, the same are either too expensive, bulky, or complex in construction and operation to have been widely received. Additionally, presently existing alarm systems require that the alarm be set at a specific attitude in order to function. In other words, these prior art devices are only capable of sensing changes of attitude from a particular given position and are not adapted to be armed or set in any of numerous attitudes.

OBJECTS OF THE INVENTION

In light of the foregoing, it is an object of the instant invention to provide an attitude change alarm which is adapted to be armed in any position, not requiring any specific attitude for operation.

Another object of the invention is to provide an attitude change alarm which is of such small size as to be capable of installation in the neck of a bicycle, in briefcases, luggage, or atop papers and books.

Another object of the invention is to provide an attitude change alarm which is inexpensive to construct.

Still an additional object of the invention is to provide an attitude change alarm which is reliable in operation, and readily adapted for construction using state-of-the-art apparatus and techniques.

SUMMARY OF THE INVENTION

The foregoing and other objects of the invention which will become apparent as the detailed description proceeds are achieved by an attitude change alarm, comprising: a casing having a wall defining a hollow interior; a plurality of resistive elements received by said wall in spaced relationship with each other and in common communication with said interior; a conductive fluid maintained within said hollow interior and in selective contacting engagement with certain of said resistive elements; circuit means interconnected between said fluid and said resistive elements for producing an output signal upon a change in said contacting engagement of said fluid with said resistive elements; and alarm means connected to said circuit means for actuation by said output signal.

DESCRIPTION OF DRAWING

For a complete understanding of the objects, techniques, and structure of the invention, reference should be had to the following detailed description and accompanying drawing wherein:

FIG. 1 is a cross-sectional view of a spherical attitude alarm showing the spherical sensor interconnected with the circuit means for sounding an alarm;

FIG. 2 is a cross-sectional view of an elliptical or egg-shaped attitude sensor according to the teachings of the invention;

FIG. 3 is a cross-sectional view of a multi-faceted attitude sensor according to the invention;

FIG. 4 is a cross-sectional view of a conical attitude sensor according to the invention;

FIG. 5 is a cross-sectional view of a flat, rectangular attitude sensor according to the invention; and FIG. 6 is a cross-sectional view of an annular disk attitude sensor according to the invention.

DETAILED DESCRIPTION OF PREFERRED EMBODIMENTS

Referring now to the drawing and more particularly FIG. 1, it can be seen that a preferred embodiment of the attitude change alarm system of the invention is designated generally by the numeral 10. A spherical shell of insulating material is designated by the numeral 12 and, as would be customary in the art, could be molded from two sphere halves and cemented together. The spherical shell or casing 12 defines a hollow interior 14 which, itself, is of a spherical nature. A plurality of resistors 16, which may be of a carbon material, are received by the casing 12 in bores provided therethrough. The resistors are maintained in spaced relationship with respect to each other, and each resistor 16 is provided with a contact head 18 which is preferably of a polished, electrically conductive material.

The external surface of casing 12 is coated with a conductive metal coating 20, such that all of the resistors 16 are in common electrical communication with each other. While it is not specifically required that the entire outer surface of the casing 12 be coated, it is necessary that electrical interconnection of the various resistors 16 be made, and small circuit paths of the conductive coating 20 could be layed out for that purpose.

A metallic ball 22 is centrally maintained within the spherically hollow interior 14 by means of a support rod 24 maintained by the casing 12. The support rod 24 is also metallic so as to be of an electrically conductive nature. A portion of the interior 14 is filled with mercury 28 or other electrically conductive fluids or liquid. The mercury 28 is maintained within the interior 14 in sufficient volume to always make contacting engagement with the metallic ball 22 regardless of the attitude or position of the sphere 12. An inert gas may, if desired for contamination purposes, be maintained in the remaining portion of the hollow interior 14.

The rod 24 passes through the casing 12 and through an opening 26 in the conductive coating 20. The rod 24 has a contact 30 at the end thereof for making connection with the primary 32 of a transformer having a secondary 34. Of course, common ends of the primary 32 and secondary 34 are connected to ground with the opposite end of the secondary 34 being connected to the gate input of the silicon control rectifier (SCR) 36. The SCR is interconnected to the alarm 38 which may be a horn, buzzer, light, or other suitable means. As is shown, the alarm 38 may be connected to a voltage source V, via the switch 40, and accordingly the SCR 36 acts as a gate for energizing the alarm 38.

As just mentioned, the switch 40 is adapted for applying power to a terminal of the alarm 38. This switch also applies power to a contact 42 which applies the potential V to the coating 20. Another switch, switch 44, is connected across the secondary 34 to selectively ground the secondary when closed, resetting the system, or to arm the system when opened by connecting the secondary 34 to the gate of the SCR 36.

In operation, the switch 40 is closed and the switch 44 is open. There is thus a voltage V applied to the ends of the resistors 16 contacting the coating 20. Depending upon the particular position or attitude of the sphere 12, electrical conduction will be made from the coating 20 through the number of resistors 16 contacted by the mercury 28 and further through the ball 22, rod 26, and primary 32. It should, of course, be understood that while FIG. 1 only shows two such resistors being contacted, there would be additional such resistors in front of and behind the plane of the paper of FIG. 1 in the three-dimensional embodiment of the spherical casing 12. If the position of the attitude change alarm 10 were to change, the mercury 28 would make and/or break contact with various of the contacts 18, increasing or decreasing the number of resistors 16 which are in electrical parallel connection to the input of the primary 32. Either an increase or decrease of the number of resistive elements result in a change of current passing through the primary 32. This instantaneous change in current is coupled into the secondary 34 which creates an impulse signal applied to the gate of the SCR 36. This impulse signal gates the SCR 36 into conduction and energizes the alarm 38. Once the SCR 36 has been gated on, it cannot be turned off and rearmed except by the switches 40,44. Accordingly, nothing that one can do with respect to attempting to reattain the position of the attitude change alarm 10 will be effective in turning off the alarm 38.

It should be noted that the SCR 36 is gated on only when a change in current is experienced by the primary 32, resulting in a coupled impulse into the secondary 34. Accordingly, the number of contacts 18 contacted by the mercury 28 when the system is armed is unimportant for the alarm system 10 senses changes in attitude and/or motion with respect to the reference established when the system is turned on and not with respect to any specific predetermined reference.

It should now be apparent to those skilled in the art that the sensitivity of the attitude change sensor and alarm of the invention is dependent upon the geometrical configuration of the assembly and the spacing and positioning of the resistors therein. FIGS. 2-6 illustrate various geometric configurations of the invention, each being particularly adapted to sense changes in attitude or motion of particular natures.

As shown in FIG. 2, a sensor 50 is defined by an elliptical or egg-shaped casing or shell 52. Again, this shell is made of an insulating material and is covered by an electrically conductive coating 54. A plurality of resistors 56 maintained within the casing shell 52 are in common communication with the coating 54. An elliptical, metallic conductor 58 is centrally maintained within the cavity defined by the casing 52 by means of a pin 66. A pool of mercury is maintained in the void existent between the elliptical conductor 58 and the shell 52. As above, the mercury 60 completes the circuit between the conductive coating 54, resistors 56, and elliptical conductor 58 to apply appropriate signals to the alarm circuitry via the conductor 62, which may also act as a supporting pin in conjunction with the pin 66. Of course, a conductor 64 is provided for applying a voltage potential to the conductive coating 54.

As should now be apparent to one skilled in the art, the elliptical sensor 50 would be more sensitive to attitude changes in the position shown in FIG. 2 with the major axis horizontal than it would if rotated 90° with the major axis being vertical. Dependent upon the desired use and environment in which the sensor 50 would be used, the posture or attitude of the sensor 50 may be selected in light of the required sensitivity.

As shown in FIG. 3, a multi-faceted sensor 70 is adapted for utilization with the circuitry of FIG. 1. Here, a shell or casing 72 having a plurality of facets or sides, both internally and externally, is provided of insulative material. Again, a conductive coating 74 is provided on the external surface of the casing 72 to make the aforementioned contacting engagement with the resistors 76. A supporting and conductive rod 78 is maintained in the casing 72, and passes through an opening in the conductive coating 74. The rod 78 centrally maintains the spherical ball 88 in the multi-faceted interior 82 of the sensor 70. Again, a portion of mercury or other conductive fluid 80 is maintained in the sensor 70 with sufficient quantity being therein to make constant contacting engagement with the ball 88, such that current is continuously transmitted from the conductor 84 through the resistors 76, mercury 80, ball 88, rod 78, and finally the conductor 86 which is, in turn, connected to the alarm control circuitry.

The operation of the sensor 70 is quite similar to that discussed with respect to FIG. 1. However, this multi-faceted sensor is quite sensitive to angles of tilt and can be used where sensing such angles is important. Of course, the more sides or facets provided on the interior of the casing 72, with a corresponding increase in the number of resistors 76, the more sensitive the unit 70 would be and, accordingly, the more responsive to smaller angular changes. It should also be briefly noted that the ball 88 might, indeed, be a multi-faceted unit complementary to the interior surface of the casing 72.

In FIG. 4, there is shown a conical attitude sensor 90 which is defined by a truncated conical casing 92 receiving a plurality of resistors 96 in common communication with the conductive coating 94. A metallic conductive cone 98 is concentrically received within the receptacle defined by the casing 92. A mercury pool 100 is received within the cavity 102 and operates in the manner described hereinabove. A cap 104 is placed over the entire unit 90 to seal the cavity 102 and to maintain the conical conductor 98. Of course, conductors 106,108 are provided for communication with the alarm circuitry. It should be appreciated that the conical sensor 90 may be used to detect centrifugal force or degrees of change in speed or motion.

Each of the sensors shown in FIGS. 1-4 are of a three-dimensional nature, with the illustrations in the drawing being of a schematic, cross-sectional nature. The sensor of FIG. 1 is spherical; that of FIG. 2 is egg-shaped or elliptical; FIG. 3 presents a multi-faceted sensor with facets not shown in the Figure angling into and out of the paper; and FIG. 4 presents a sensor in the form of a truncated cone. Being of a three-dimensional nature, it will be understood that a large plurality of resistors are included in the respective casing of the sensors, with the cross-sectional view shown in the drawing only being representative of any of a number of cross-sectional views which might be taken of the sensors. Accordingly, these sensors are highly responsive to motions in any direction.

In FIG. 5, a flat, rectangular attitude sensor 110 is defined by a rectangular shell 112. Again, a plurality of resistors 116 are received by the shell 112, and the outer surface thereof is coated by a conductive coating 114. A conductive surface 118 is provided in the form of a cap which, received by the shell 112, defines a cavity 122 which receives a mercury pool 120. The sensor 110 may be used as a shaker or motion alarm switch, sensing movement in a two-dimensional plane, and correspondingly communicating with the alarm circuitry via the conductors 124,126.

A final embodiment of the invention is shown in FIG. 6 as a disk sensor 130. Here, an annular disk 132 of insulative material is provided with a conductive coating 134 and receives therein a plurality of resistors 136. A conductive disk 138 is centrally maintained within the cavity 142 and defines a race about which a mercury pool 140 may travel. Conductors 144,146 are again provided for communication with the alarm control circuitry.

The disk or toroidal sensor 130 may be used to detect very small, angular changes of a surface or an item to which it is attached. The sensor 130 is laid flat on the item and angular changes or motion are thereby detected as the mercury pool 140 moves between the conductive disk 180 and certain of the resistors 136.

Thus it can be seen that the objects of the invention have been satisfied by the structures presented hereinabove. The sensors and alarm system of the invention can be used to detect a change in motion or attitude and may be placed in any position when armed. Movement of the article to which the sensor is attached out of its original position will actuate the sensor and accordingly activate the alarm. The devices shown may be constructed in very small packages and may be adapted for use within any of a number of items for which security is desired. While a number of embodiments of the invention have been presented and described in detail, it will be appreciated that those skilled in the art, having the benefit of the foregoing teachings, would be able to change and/or modify the foregoing embodiments while staying within the confines of the basic theme of the invention. Accordingly, while only the best modes and preferred embodiments of the invention have been presented and described in detail, the invention is not limited thereto or thereby. Consequently, for an appreciation of the true scope and breadth of the invention, reference should be had to the appended claims.

What is claimed is:

1. An apparatus for sensing changes in attitude or motion, comprising:
   a casing having a wall defining a hollow interior;
   a plurality of resistive elements in common communication with said interior through said wall;
   a conductive fluid maintained within said hollow interior and in selective current conducting engagement with certain of said resistive elements; and
   circuit means interconnected between said fluid and said resistive elements for producing an output signal upon a change in said current conducting engagement of said fluid with said resistive elements.

2. The apparatus for sensing changes in attitude or motion according to claim 1 wherein said circuit means includes a gating device which is latched into conduction by said output signal.

3. The apparatus for sensing changes in attitude or motion according to claim 2 wherein said gating device is an SCR having a gate thereof connected to a transformer which receives said output signal.

4. The apparatus for sensing changes in attitude or motion according to claim 1 wherein an electrode is received within said hollow interior, said electrode making constant contacting engagement with said conductive fluid.

5. The apparatus for sensing changes in attitude or motion according to claim 4 wherein said electrode is of the same geometrical shape as said interior.

6. The apparatus for sensing changes in attitude or motion according to claim 1 wherein said casing has an outside surface coated with a conductive material which is in contacting engagement with each of said resistive elements.

7. The apparatus for sensing changes in attitude or motion according to claim 1 wherein said hollow interior is spherical.

8. The apparatus for sensing changes in attitude or motion according to claim 1 wherein said hollow interior is elliptical.

9. The apparatus for sensing changes in attitude or motion according to claim 1 wherein said hollow interior is multi-faceted.

10. The apparatus for sensing changes in attitude or motion according to claim 1 wherein said hollow interior is conical.

11. The apparatus for sensing changes in attitude or motion according to claim 1 wherein said casing comprises an annular disk.

12. The apparatus for sensing changes in attitude or motion according to claim 1 wherein said casing is box-shaped.

13. An attitude sensor and switch, comprising:
    a casing defined a hollow interior;
    a plurality of resistors maintained by said casing, each having one end thereof communicating with said hollow interior;
    a conductive fluid movable within said hollow interior and in constant communication with said electrode and certain of said resistors; and
    circuit means interconnected between said electrode and said resistive elements for producing an output signal upon a change in said communication between said fluid and said resistors.

14. The attitude sensor and switch according to claim 13 wherein second ends of said resistors are commonly connected to a voltage potential.

15. The attitude sensor and switch according to claim 13 wherein said circuit means includes a transformer interconnected between said electrode and the gate of an SCR, said SCR being in series connection with an alarm device.

16. The attitude sensor and switch according to claim 15 which further includes a switch across secondary windings of said transformer.

* * * * *